United States Patent [19]
Orita et al.

[11] Patent Number: 5,222,024
[45] Date of Patent: Jun. 22, 1993

[54] METHOD OF AND APPARATUS FOR CONTROLLING VEHICLE SPEED

[75] Inventors: Tomiyoshi Orita, Kasai; Shinjiro Shibata, Kakogawa, both of Japan

[73] Assignee: Tsubakimoto Chain Co., Osaka, Japan

[21] Appl. No.: 641,375

[22] Filed: Jan. 15, 1991

[30] Foreign Application Priority Data

Jan. 18, 1990 [JP] Japan ................................. 2-10058

[51] Int. Cl.$^5$ ............................................ G06F 15/46
[52] U.S. Cl. ............................... 364/468; 364/565; 246/182 C; 104/300
[58] Field of Search ............... 364/468, 424.02, 424.01, 364/561, 565; 246/182 R, 182 A, 182 B, 182 BH, 182 C; 104/295-300

[56] References Cited

U.S. PATENT DOCUMENTS

| | | | |
|---|---|---|---|
| 3,639,753 | 2/1972 | Reich | 246/182 C |
| 3,808,427 | 4/1974 | Malon et al. | 246/182 C |
| 3,885,137 | 5/1975 | Ooya et al. | 364/565 |
| 4,216,530 | 8/1980 | Yamaki et al. | 364/565 |
| 4,352,064 | 9/1982 | Dunn | 364/565 |
| 4,876,527 | 10/1989 | Oka et al. | 364/565 |
| 4,922,447 | 5/1990 | Reichel | 364/565 |
| 4,931,966 | 5/1990 | Ishizaka | 364/565 |
| 4,959,807 | 9/1990 | Thompson et al. | 364/565 |
| 4,984,521 | 1/1991 | Riley | 264/182 C |

FOREIGN PATENT DOCUMENTS

| | | |
|---|---|---|
| 50-103010 | 8/1975 | Japan . |
| 54-95277 | 7/1979 | Japan . |

*Primary Examiner*—Jerry Smith
*Assistant Examiner*—Thomas E. Brown
*Attorney, Agent, or Firm*—Townsend and Townsend Khouric and Crew; Khourie and Crew

[57] ABSTRACT

A method of and an apparatus for controlling the moving speed of a vehicle, which makes a vehicle run at a constant speed independent of applied load by specifically instructing the moving speed according to the difference between the computed number of pulses and the actually detected number of pulses. The vehicle moving speed is properly controllable in correspondence with load applied to the moving vehicle. The apparatus includes a pulse generator which outputs pulses relative to the movement of the vehicle, a unit pulse calculation unit which counts the number of pulses outputted while the vehicle fully passes through a predetermined travel distance and then computes either the traveling distance per unit-pulses or the number of pulses per unit distance, a predetermined position operation unit which computes the number of pulses to be outputted in a specific period of time in which the vehicle from an optional position arrives at the predetermined position after elapse of the predetermined period of time on the basis of the computed number of outputted pulses and the setup speed at the moment of computing the number of pulses, and a present position computing unit which detects the number of pulses actually outputted in a predetermined period in which the vehicle from an optional position arrives at the predetermined position after elapse of a predetermined period of time, respectively.

20 Claims, 11 Drawing Sheets

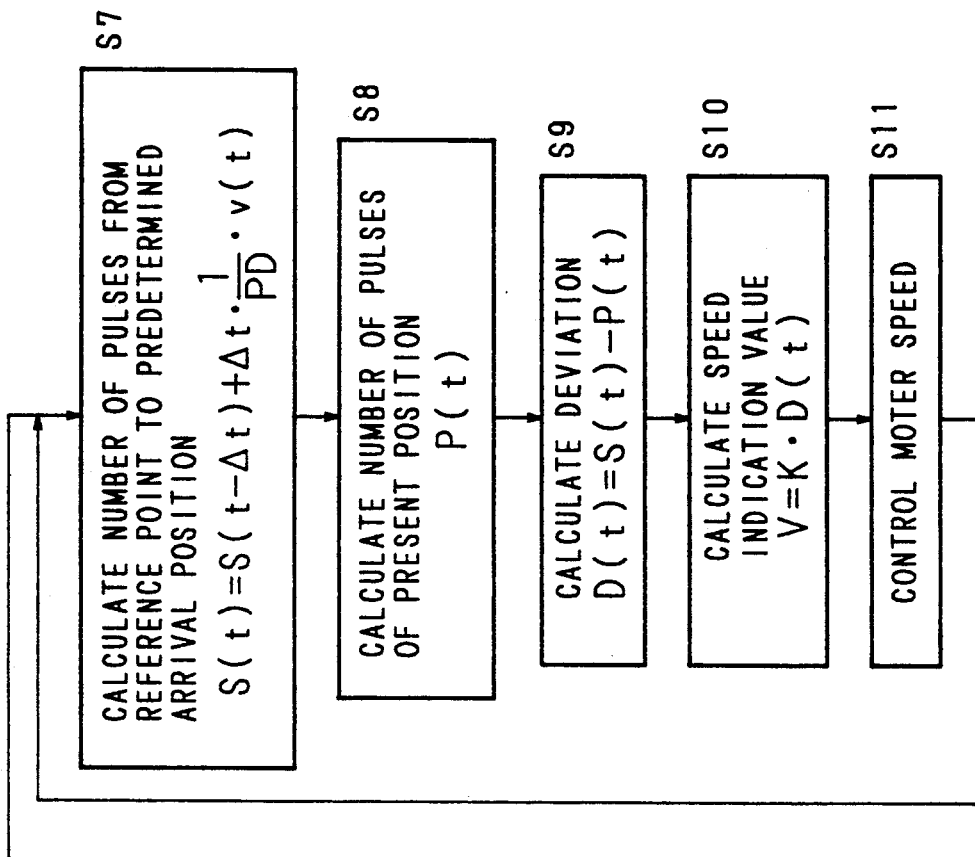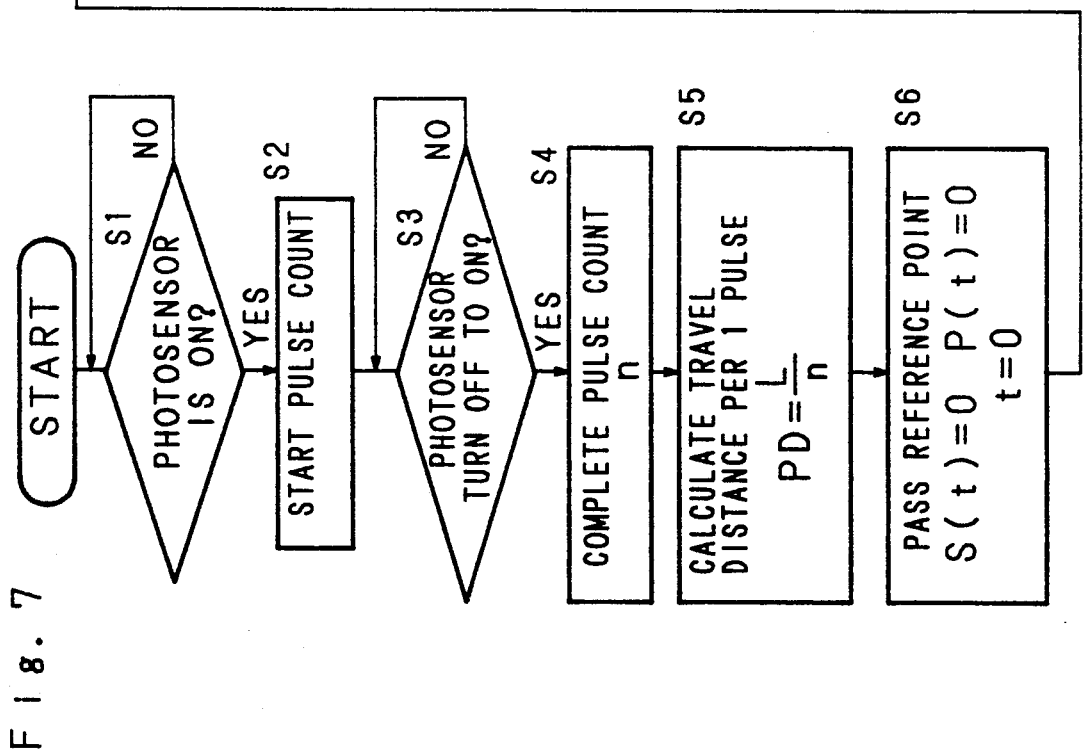
Fig. 7

METHOD OF AND APPARATUS FOR CONTROLLING VEHICLE SPEED

BACKGROUND OF THE INVENTION

1. Field of the Invention

The present invention relates to a method of and an apparatus for controlling vehicle speed. More particularly, the invention relates to the method of and the apparatus for automatically controlling the moving speed of a vehicle at the target speed with improved precision.

2. Description of Related Art

Typically, an art related to a method of and an apparatus for automatically correcting the traveling distance and the traveling speed of a vehicle was previously proposed in the Japanese Laid-Open Patent Publication No. 54-95277 of 1979 for example. This prior art is provided with a vehicle speed detector which generates pulses in response to the running speed of a vehicle, the distance computed by integrating pulses corresponding to the actual speed of the vehicle between the predetermined positions being compared with the distance between the predetermined positions, and then computes the corrective coefficient before eventually correcting the vehicle speed.

An automatic train drive control unit disclosed in the Japanese Laid-Open Patent Publication No. 50-103010 of 1975 comparatively computes the number of pulses outputted from a speed generator while the train runs through the reference distance against the reference pulse number determined in accordance with the reference distance, and then on the basis of the actual diameter of wheels of the train yielded from the result of computation, the above train drive control system corrects the data of the wheel diameter in order that the traveling speed of the train can be corrected.

According to the method of and the apparatus for the automatic correction of the traveling distance and speed of a vehicle or the automatic train drive control unit cited above, the moving speed of a vehicle or a train can be controlled at a specific level. Nevertheless, neither of these prior arts can properly solve speed error caused by variable load on the part of the vehicle or the train. More particularly, both of these prior arts merely corrects the moving speed or the data on the diameter of wheels of the vehicles by solely comparing the distance between the predetermined positions (or the pulse number determined by the reference distance) with the distance (or the number of pulses outputted during this period), and thus, even when the traveling speed is variable by variation of load caused by deviation from the predetermined distance or from the reference distance, neither of these prior arts could properly correct the varied speed. Accordingly, there is a problem that each of the vehicles cannot be moved at a constant speed and pitch in the case where each load of a plurality of non-connected vehicles vary.

SUMMARY OF THE INVENTION

The invention has been achieved to fully solve those problems inherent in any of those conventional arts.

The primary object of the invention is to provide a novel method of and an apparatus for precisely controlling the moving speed of a vehicle, the method embodied by the invention executing those sequential control steps including the following; counting of the number of pulses outputted in a specific period of time in which a vehicle passes through the reference distance; computation of the predetermined arrival position of the vehicle when the vehicle moves on at the predetermining speed and for the predetermined period of time; computation of the number of pulses that are likely to be outputted by the moment when the vehicle arrives at the predetermined position by applying a certain value relevant to the counted pulse number; computation of the difference between the counted pulse number and the number of pulses actually outputted during the predetermined period of time every predetermined cycle; and execution of control of the moving speed of the vehicle.

By virtue of execution of those control steps mentioned above, even when such a factor affecting the moving speed of a vehicle like varied load occurs on the way of run, the vehicle is allowed to keep on running itself at a constant speed by utilizing the differential number of pulse. Furthermore, even in the case of a lengthy train consisting of a number of coaches or freight cars, the train can also keep on running at a constant pitch as well.

Another object of the invention is to provide a novel method of and a novel apparatus for controlling the moving speed of a vehicle with surpassing precision by correcting time-dependent speed varying factors inherent in the vehicle every time the vehicle passes by a plurality of gauges or pairs of strikers installed on the traveling path used for setting the reference distance.

A still further object of the invention is to provide a novel method of and a novel apparatus for automatically controlling the moving speed of vehicles with surpassing precision by effectively preventing generation of ineffective pulses that may be generated by accidental slip of the vehicle. This object can effectively be achieved by provision of a pulse generator which is secured to either the driving or the follower wheel connected to the vehicle, and as a result, the correct number of pulses corresponding to the traveling distance can constantly become available.

The above and further objects and the feature of the invention will more fully be apparent from the following detailed description and the accompanying drawings.

BRIEF DESCRIPTION OF THE DRAWINGS

FIG. 7 designates an operational flowchart representing the content of the sequential control steps performed by the speed controller unit;

DESCRIPTION OF THE PREFERRED EMBODIMENTS

Referring now more particularly to the accompanying drawings, a preferred embodiment of the invention is described below.

Figure 1:
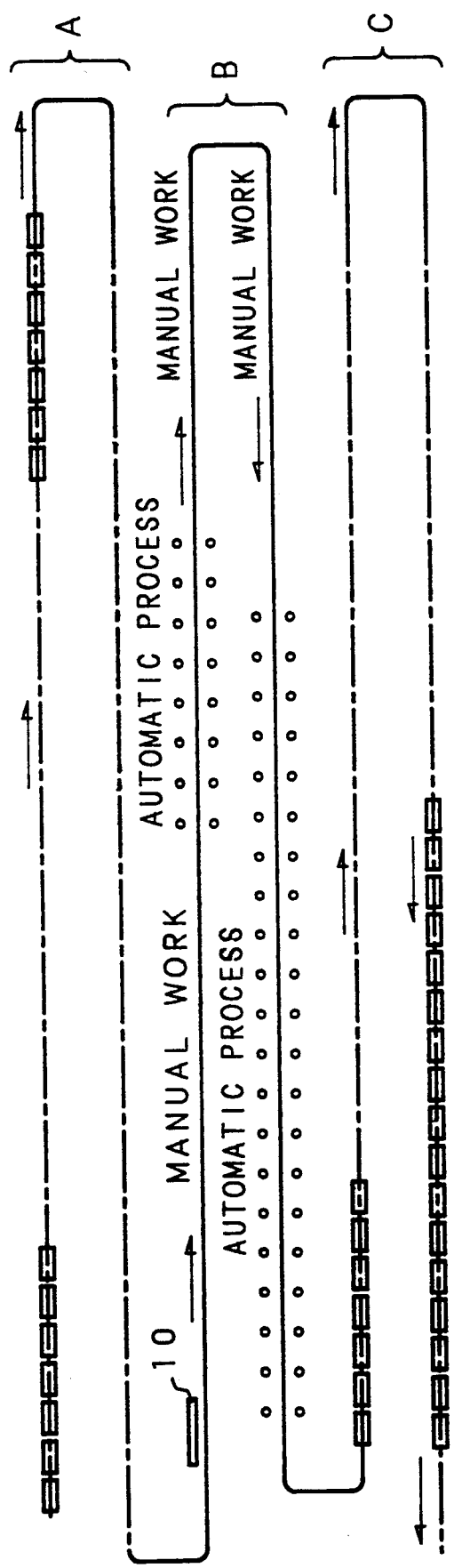
FIG. 1 designates a plan of a vehicle-conveying path built in an automobile assembly factory.

First, practical application of the method of and the apparatus for controlling the vehicle speed to the assembly line of an automobile assembly factory is described below for example. As shown in FIG. 1, automobile bodies under an assembly process are conveyed forward in order of the preliminary rigging line A, the wheel fitting line B, and the final rigging line C, respectively. The preliminary rigging line A initially fits parts to the automobile bodies completed with painting process, where the automobile bodies are still held at a low position slightly above the working floor. The wheel fitting line B fits all the mechanical parts needed for the wheel mechanism, where the automobile bodies are respectively suspended by a plurality of hangers at a proper height position to allow the assembly workers and robots to engage in the part-fitting operation beneath the automobile bodies. The final rigging line C again lowers the height positions of automobile bodies to a level slightly by above the working floor. A gause is provided for the entrance of the wheel-fitting line B.

Figure 2:
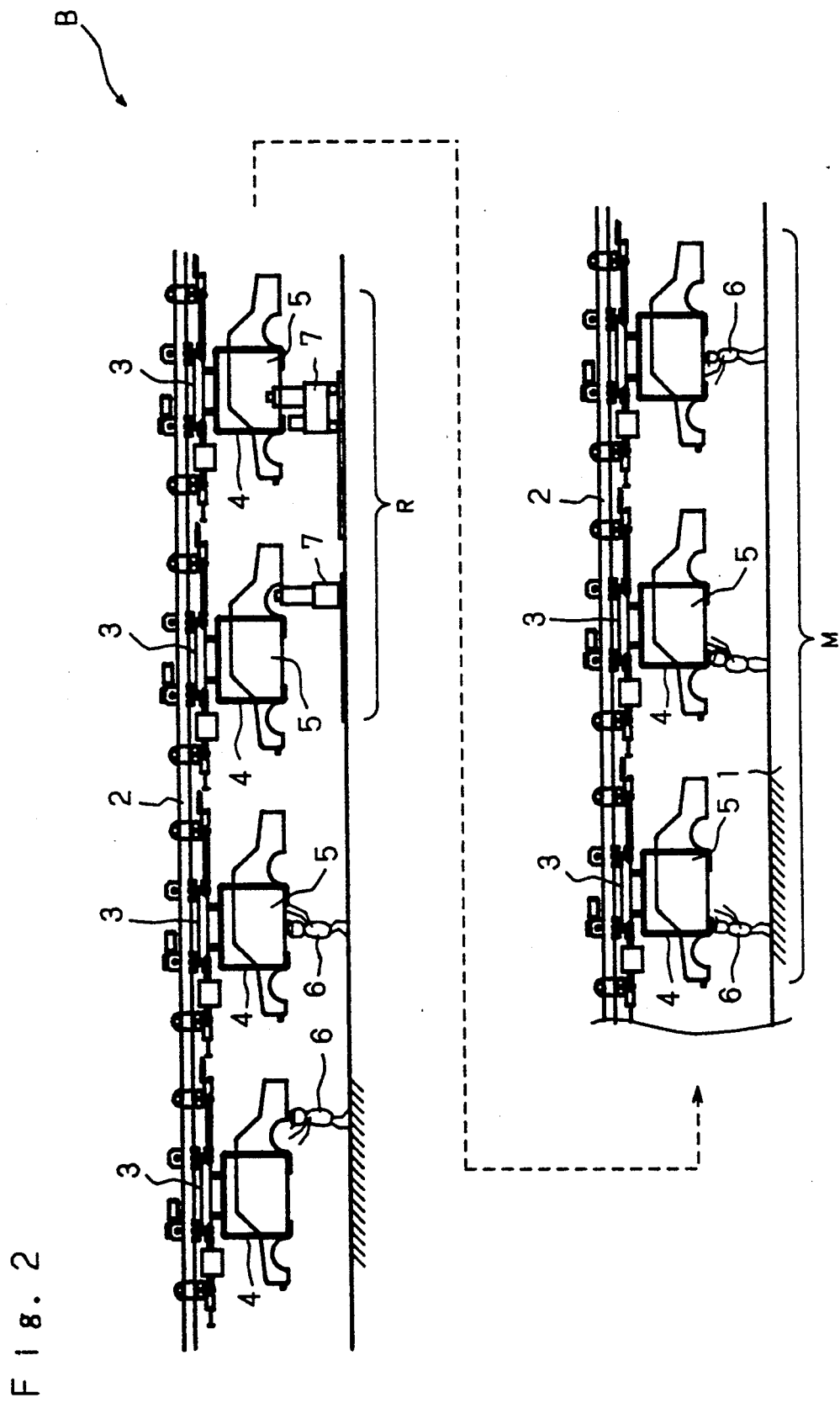
FIG. 2 designates a lateral aspect of the wheel fitting line conveying a number of automobile bodies.

FIG. 2 designates a lateral view of the wheel fitting line B which conveys automobile bodies forward. A track 2 is installed along the conveying path far above the working floor 1. A plurality of vehicles 3, 3 . . . are provided for the track 2 so that these vehicles 3, 3 . . . can simultaneously start to move forward on receipt of the moving instruction signal from the ground control source.

A plurality of hangers 4 are respectively secured to the bottom surface of the vehicles 3, 3 . . . to properly suspended automobile bodies 5, 5 . . . . There are two working ranges in the wheel fitting line B including the working range M in which assembly workers 6, 6, manually fix mechanical parts to these automobile bodies and the other working range R in which assembly robots 7, 7 . . . automatically fix mechanical parts to the automobile bodies.

In order to promote the conveying efficiency, it is necessary for the assembly system to keep those vehicles 3, 3, move on themselves in the working range M at a slow and constant speed and at a constant pitch to allow the assembly workers 6, 6, . . . to continuously assemble the predetermined parts without stopping the movement of the automobile bodies 5, 5, . . . . On the other hand, while the automobile bodies 5, 5, . . . still remain in the working range R, in order to allow those assembly robots 7, 7, . . . to securely execute the predetermined assembly operation, those vehicles 3, 3, . . . are respectively held still at the predetermined positions. As soon as these robots 7, 7, respectively terminate the assembly operation, the assembly system needs to quickly activate movement of these vehicles 3, 3, . . . and then quickly decelerate themselves to fully stop at the following predetermined assembly position by performing "tact" run.

Furthermore, each of these vehicles 3, 3, . . . needs to satisfy those requirements including extremely precise stopping capability, freedom from incurring impact, and security against accidental runaway, respectively.

Figure 3:
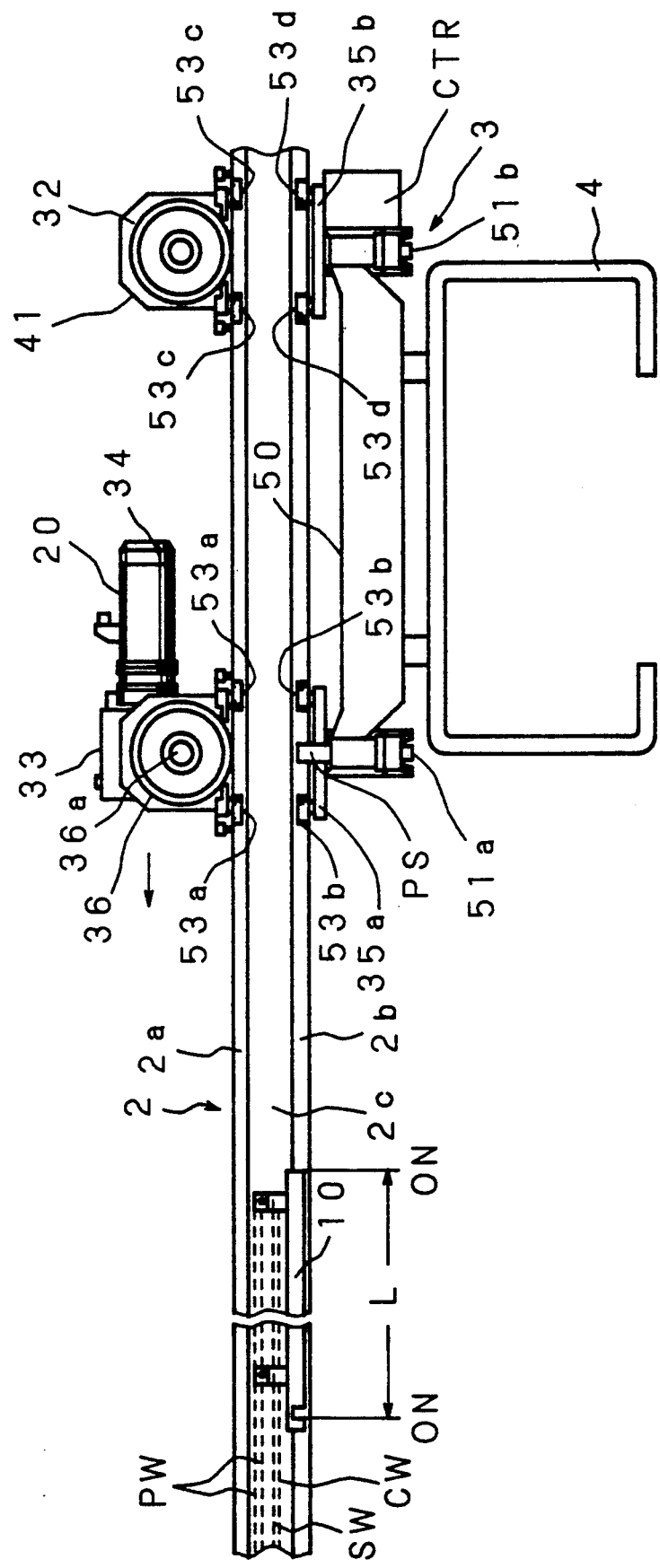
FIG. 3 designates a lateral view of a vehicle connected to the track.

FIG. 3 designates a lateral view of the vehicle 3 which is engaged with the track 2 and ready to start moving itself. The track 2 comprises a web 2C which is made from H-shaped aluminum body and installed in the vertical direction. The track 2 is provided with upper flanges 2a and 2a and bottom flanges 2b and 2b which are of the identical length and extend themselves in the direction orthogonally intersecting the longitudinal direction of the track 2. A driving wheel 36 of the vehicle 3 is disposed so that it can rotate itself on the upper surface of the track 2. A rotary shaft 36a which is engaged with the driving wheel 36 is connected to the rotary shaft of a motor 20 via the reduction gear unit 33. A pulse encoder 34 is stored in the tip space of the motor 20. The pulse encoder 34 outputs constant-pitch pulses in correspondence with the rotation of the driving wheel 36.

Two pairs of guide wheels 53a and 53a (only one-side is shown) are installed below and on both the front and rear ends of the reduction gear unit 33 by way of sandwiching the track 2 so that these guide wheels 53a and 53a can rotate themselves along the lateral surfaces of the upper flanges 2a and 2a. The upper ends of a C-shaped connector are secured to the reduction gear unit 33, where the C-shaped connector is vertically installed astride across the upper and bottom edges of the track 2 on the side opposite from the driving wheel 36 without coming into contact with the track 2 at all. A guide-wheel fixing plate 35a is secured to the bottom edge of the C-shaped connector below the track 2. The other two pairs of guide wheels 53b and 53b (only one-side is shown) are installed on the guide-wheel fixing plate 35a by way of horizontally sandwiching the track 2, where these guide wheels 53b and 53b respectively rotate themselves along the lateral surfaces of the bottom flanges 2b and 2b of the track 2 in conjunction with the above guide wheels 53a and 53a on the track 2. In this way, the driving wheel 36 is guided along the track 2 by those guide wheels 53a and 53a, 53b and 53b, and another pair of guide wheels (not shown) opposite from each other across the track 2 so that the driving wheel 36 can be prevented from falling off the track 2.

On the other hand, a follower wheel 32 is disposed at a position adequately apart from the driving wheel 36 so that the follower wheel 32 can also rotate itself on the upper surface of the track 2. The follower wheel 32 is secured to a follower wheel housing 41. Likewise, two pairs of guide wheels 53c and 53c (only one-side is shown) are installed below and on both the front and rear ends of the follower wheel housing 41 so that these guide wheels 53c and 53c can also rotate themselves along the lateral surfaces of the upper flages 2a and 2a by way of horizontally sandwiching the track 2. The upper end of another C-shaped connector having the shape identical to the one provided for the driving wheel 36 is secured to the follower wheel housing 41 at the position opposite from the follower wheel 32. Another guide-wheel fixing plate 35b is secured to the bottom end of this connector at the position below the track 2. Two pairs of guide wheels 53d and 53d (only one-side is shown) are respectively secured onto the guide-wheel fixing plate 35b, where these guide wheels 53d and 53d rotate themselves along the lateral surfaces of the bottom flanges 2b and 2b by way of horizontally sandwiching the track 2. In this way, the follower wheel 32 is guided along the track 2 by those guide wheels 53c and 53d and another pair of guide wheels (not shown) opposite from the guide wheels 53c, 53d across the track 2 so that the follower wheel 32 can be prevented from falling off the track 2.

The driving wheel 36 and the follower wheel 32 are respectively connected to a vehicle body 50 which is connected to the two pairs of supporting shafts 51a and 51b secured to the guide-wheel fixing plates 35a and 35d and yet extending themselves downward from these guide-wheel fixing plated 35a and 35b, where the vehicle body 50 is rotatably connected to those supporting shafts 51a and 51b. A speed controller CTR in connection with the motor 20 and the pulse encoder 34 is secured to the guide-wheel fixing plate 35b which is at the rear of the vehicle body 50 below the follower wheel 32.

A photosensor PS containing a sectionally U-shaped slit opening itself upward is secured to a lateral surface of the guide-wheel fixing plate 35a on the part of the driving wheel 36. The photosensor PS has such a mechanism capable of projecting light from one end to the other end across the U-shaped slit. A lengthy rectangular sheet-like gauge 10 is secured to the web 2c of the track 2 by aligning its longitudinal direction in parallel with the lateral and bottom surfaces of the track 2, where the gauge 10 is secured to a proper position which allows the emitted light to pass through the slit without coming into contact with the slit itself.

A power-supply wire PW supplying power to the motor 20, a signal wire SW transmitting the setup speed signal to the speed controller unit CTR, and a control wire CW transmitting instructional signals to activate or stop the movement of the vehicle 3, are respectively installed along the lateral surface of the web 2c in the longitudinal direction of the track 2. These power-supply wires PW, signal wire SW, and the control wire CW, are respectively connected to the speed controller CTR and a drive controller 60 via a collector (not shown) provided for the vehicle 3.

When power is supplied to the motor 20 via the power-supply wire PW and then the movement activating instruction signal is delivered to the motor 20 via the control wire CW, the motor 20 starts to rotate the driving wheel 36 so that the driving wheel 36 can move itself along the track 2 on the basis of the prescribed speed. When the driving wheel 36 and the follower wheel 32 pass through a curved portion of the track 2, both wheels respectively oscillate themselves along the curvature of the track 2 in the same way as is conventionally performed by a bogie, and as a result, both wheels can smoothly pass through the curved portion of the track 2.

Figure 4:
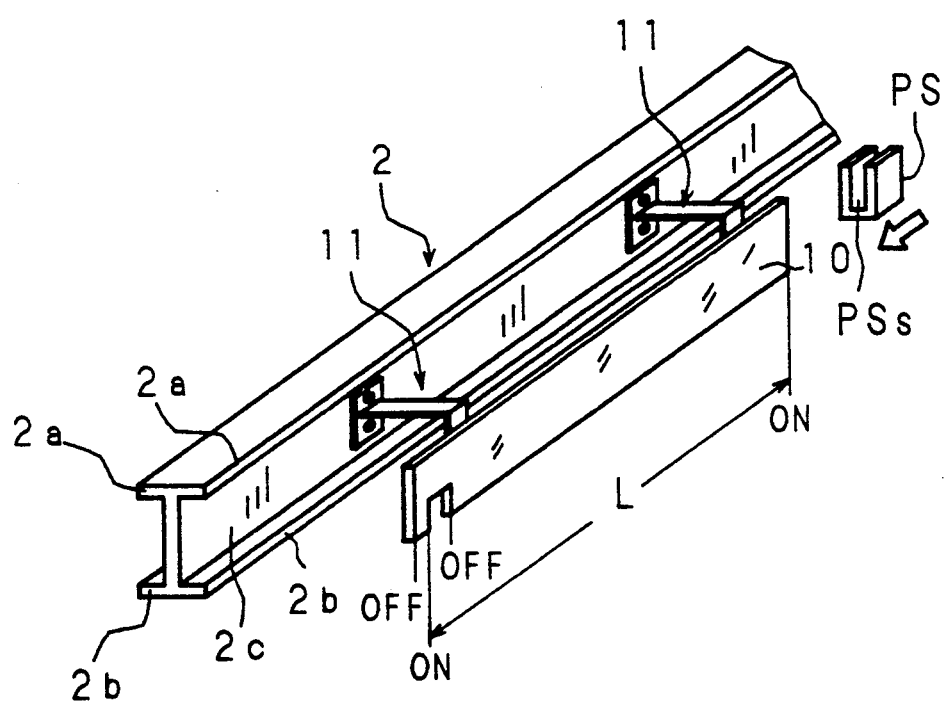
FIG. 4 designates a perspective view of a gauge which is installed to the track.

FIG. 4 designates a perspective view of the gauge 10 which is secured to the track 2. The gauge 10 is made from a metallic light-shielding sheet of lengthy rectangular shape. A rectangular cutout portion 10a opening itself downward is provided at a position close to an end of the gauge 10. The gauge 10 is secured across both tips of brackets 11 and 11 which are discretely installed to the web 2c of the track 2 at a proper interval in the longitudinal direction of the track 2.

When the photosensor PS approaches the gauge 10 from the direction shown by the arrow and then the gauge 10 is inserted into the slit PSs of the photosensor PS, light (not shown) emitted out of the photosensor PS is shut off at the front edge of the gauge 10 to turn the photosensor PS ON. Then, as soon as the photosensor PS arrives at the front edge of the cutout portion 10a, the light shielded condition is terminated to turn the photosensor PS OFF. As soon as the photosensor PS arrives at the front edge of the cut out portion 10a of gauge 10, light is again shut off to turn the photosensor PS ON. Then, as soon as the photosensor PS leaves the rear edge of the gauge 10, the photosensor PS again turns OFF. On the basis of this functional mechanism, the reference distance L is determined in accordance with a specific period of time in which the vehicle 3 equipped with the photosensor PS passes along the gauge 10 causing the photosensor PS to turn itself ON, OFF and then ON. In other words, the reference distance L is determined by the length between the ending edge of the gauge 10 and the trailing edge of the cutout portion 10a.

Figure 5:
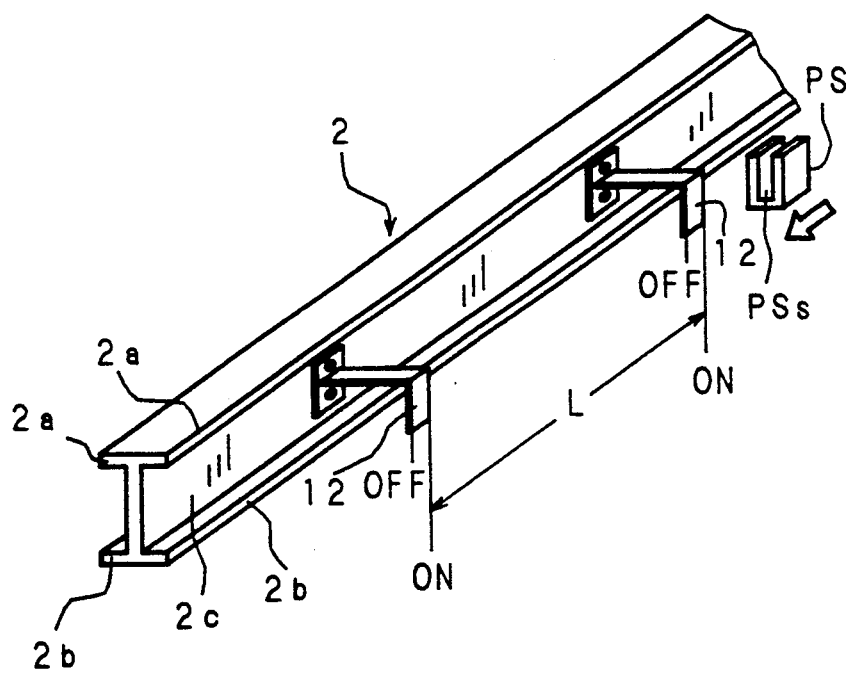
FIG. 5 designates a perspective view of a pair of strikers which are installed to the track.

FIG. 5 designates a perspective view of a pair of strikers 12 and 12 which are respectively secured to the track 2. The pair of strikers 12 and 12 are respectively composed of an L-shaped rectangular metallic light-shielding plate, each of these L-shaped plates being secured to the web 2c of the track 2 in the state that the tip portion thereof being bent downward at an appropriate interval in the longitudinal direction of the track 2. When the vehicle 3 (not shown) equipped with the photosensor PS approaches the first striker 12 and then this striker 12 is inserted into the slit PSs of the photosensor PS, like the case of the gauge 10 mentioned above, the photosensor PS turns ON at the front edge of the striker 12. Then, the photosensor PS again turns OFF at the rear edge of the striker 12. When the photosensor PS arrives at the front edge of the second striker 12, the photosensor PS again turns ON, and then, as soon as the photosensor PS arrives at the rear edge of the second striker 12, the photosensor PS again turns OFF. According to this functional mechanism, the reference distance L is determined on the basis of a specific period of time within which the photosensor PS turns ON, turning OFF and then again turns ON. In other words, the reference distance L is determined by the length between the leading edge of the first striker 12 and the leading edge of the second striker 12.

Figure 6:
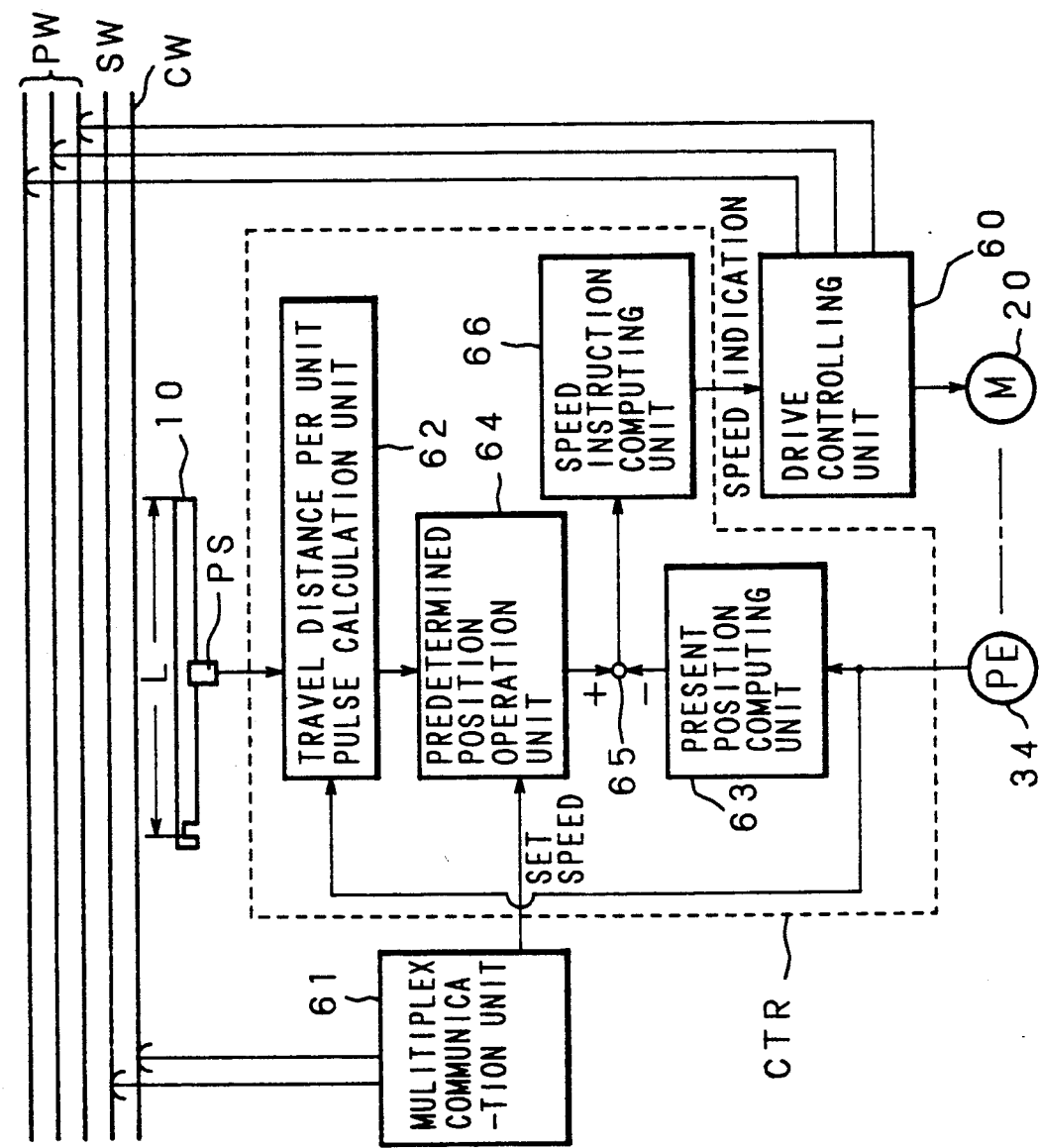
FIG. 6 designates a schematic block diagram of the speed controller unit and the peripheral structure thereof.

FIG. 6 designates the schematic block diagram of the speed controller unit CTR which controls the moving speed of the vehicle 3. The power-supply wires PW are connected to the drive controlling unit 60 which controls the rotation of the motor 20. The signal wire SW and the control wire CW are respectively connected to a multiplex communication unit 61. The ON-OFF signal pertaining to the operation of the photosensor PS is transmitted to a travel-distance per unit-pulses calculation unit 62. Pulses outputted from a pulse encoder 34 are transmitted to a present-position computing unit 63 and the travel-distance per unit-pulses calculation unit 62, respectively. The signal outpulled from the travel-distance per unit-pulses calculation unit 62 is transmitted to a predetermined position operation unit 64, a setup speed signal from the multiplex communication unit 61 being also transmitted to the unit 64. The signal outputted from the predetermined position operation unit 64 is coupled to the adder 65. The adder 65 receives the signal outputted from the present position computing unit 63. The adder 65 outputs a signal to a speed instruction computing unit 66. The speed instruction signal outputted from the speed instruction computing unit 66 is transmitted to the drive controlling unit 60.

Figure 8:
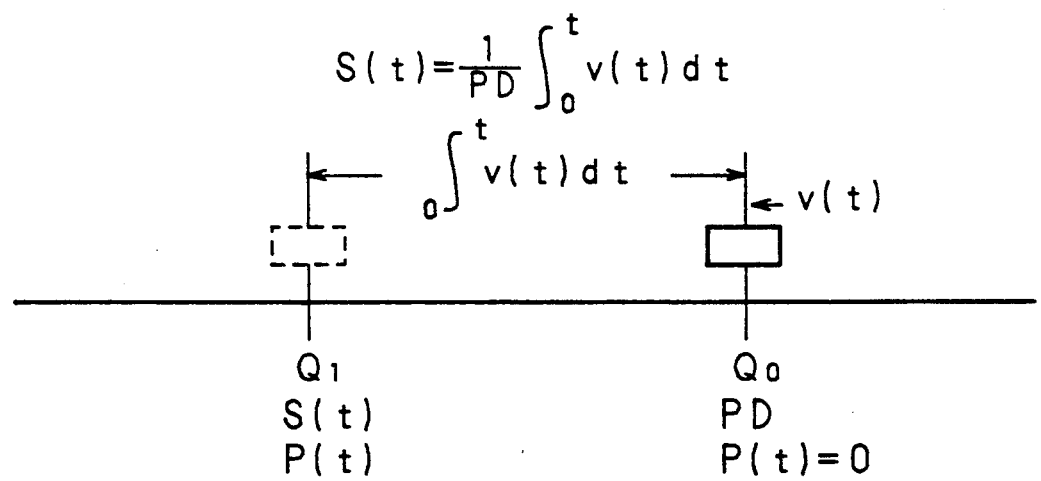
FIG. 8 designates the principle of the method of controlling the moving speed of the vehicle.

Referring now to FIG. 8, the principle of the method of controlling the moving speed of the vehicle 3 is described below. Assume that the number of pulses P(t) preliminarily counted at a certain position Qo is 0 and the travel amount per pulse to be PD for example. On the basis of this prerequisite, the predetermined arrival position Q1 at a setup speed v(t) after passage of time "t" is determined by expression $$\int_0^t v(t)dt,$$

and as a result, the number of pulses S(t) until the vehicle 3 arrives at the predetermined position Q1 can be computed by the expression shown below.

$$\frac{1}{PD} \int_0^t v(t)dt$$

Next, a comparative calculation is performed between the computed number of pulse S(t) and the counted number of pulse P(t) after a predetermined time "t" is past, and then, on the basis of the difference between these values, the moving speed of the vehicle 3 can be controlled. In consequence, the vehicle 3 can keep on moving at a constant speed by repeatedly executing the above control method every minimal interval.

Next, referring now to the flowchart shown in FIG. 7 designating the content of the control sequence of the speed controller CTR, the method of controlling the moving speed of the vehicle 3 by applying the vehicle-speed control apparatus embodied by the invention is described below.

In order to activate the movement of the vehicle 3, first, the multiplex communication unit 61 outputs a setup speed signal instructing the moving speed of the vehicle 3 to the predetermined position operation unit 64. Acting on the received setup speed signal, the predetermined position operation unit 64 outputs a pulse signal to the adder 65, this signal containing data on the number of pulses relevant to the setup speed. However, since the vehicle 3 still remains still at this moment, the pulse encoder 34 still holds 0 of the pulse number, and as a result, the adder 65 merely outputs the number of pulses received from the predetermined arrival position computing unit 64 to the speed instruction computing unit 66. Next, on the basis of the speed instruction signal outputted from the speed instruction computing unit 66, the drive controlling unit 60 activates the rotation of the motor 20 in connection with the setup speed to allow the vehicle 3 to start to move on itself at the setup speed.

As soon as the vehicle 3 starts to move on itself, the pulse encoder 34 outputs pulses to the travel-distance per unit-pulses calculation unit 62 corresponding to the amount of the movement of the vehicle 3. When the moving vehicle 3 passes by the gauge 10, the photosensor PS detects the presence of the gauge 10. This activates step S1, in which the travel-distance per-unit pulses calculation unit 62 checks to see if the photosensor PS has turned ON, or not. In the case where the photosensor PS is ON, then step S2 is entered to allow the pulse encoder 34 to start to count pulses from the instant at which the photosensor PS has turned ON. Next, after the photosensor PS has turned OFF, the following step S3 is entered to allow travel distance per unit-pulses calculation unit 62 to check to see if the photosensor PS has again turned On or not. In the case where the photosensor PS is ON, the other words, if the photosensor PS has already passed out of the reference distance L, the step S4 is entered to cause the pulse encoder 34 to terminate the pulse counting operation at the instant at which the photosensor PS has just turned ON. Then, the travel distance per unit-pulses calculation unit 62 checks the number (n) of those pulses generated while the vehicle 3 was still in the range of the reference distance L. On the other hand, the present position computing unit 63 counts those pulses outputted from the pulse encoder 34 before integrating the counted pulses.

Next, step S5 is entered to cause the present position computing unit 63 to compute the travel amount PD per pulse run by the vehicle 3 on the basis of the number (n) of those pulses counted when the vehicle 3 has just passed by the gauge 10 in the reference distance L by applying the equation shown below.

$$PD = \frac{L}{n} \tag{1}$$

Furthermore, when the present position computing unit 63 detects that the vehicle 3 has just arrived at the reference point, the entrance of the constant speed applicable region for example, the present position computing unit 63 temporarily resets the number of the counted pulses S(t) up to the predetermined arrival position after elapse of a predetermined period of time and also resets the already counted number of pulses P(t) designating the present position of the vehicle 3 altogether in the following step S6. Then, by fixing the reference point at the time "t"=0, the present position computing unit 63 computes the predetermined arrival position of the vehicle 3 on the basis of its movement at the setup speed v(t) for a period corresponding to "t" hours by applying the expression $$\int_0^t v(t)dt,$$

and then on the basis of the previously computed travel amount PD and the setup speed v(t), the present position computing unit 63 computes the number of pulses S(t) up to the predetermined arrival position by applying the equation shown below in the following step S7.

$$S(t) = S(t - \Delta t) + \Delta t \cdot \frac{1}{PD} \cdot v(t) \tag{2}$$

Furthermore, the present position computing unit 63 counts the number of pulses P(t) at the present position after the predetermined period of time "t" has just past by constantly integrating those pulses outputted from the pulse encoder 34 starting from the reference point after completing the counting of those output pulses. Then, the present position computing unit 63 transmits the counted pulse number S(t) and the integrated pulse number P(t) to the adder 65. The adder 65 then computes the difference D(t) between those pulses S(t) and P(t) in the following step S9 by applying the equation shown below.

$$D(t) = S(t) - P(t) \tag{3}$$

Next, the processing advances to step S10, in which the speed instruction computing unit 66 computes the speed instruction value V for controlling the setup speed relevant to the subsequently computed difference D(t) by applying the equation shown below.

$$V = K \cdot D(t) \qquad (4)$$

where K designates the proportional constant.

The speed instruction computing unit 66 then transmits a specific signal relevant to the speed instruction value V to the drive controlling unit 60, then controls the amount of current flowing through the motor 20 to properly control the moving speed of the vehicle 3 in the following step S11.

The number of pulses S(t) counted on the way of step S7 is added to the last value S(t−Δt) every minimal time Δt, where the pulse values are repeatedly computed, and then, the computed number of pulses S(t) is constantly compared to the counted number of pulses P(t). As a result, the moving speed of the vehicle 3 is precisely controlled every minimal time Δt, and thus, the vehicle 3 moves on itself at a constant speed. In this way, independent of variable load, the vehicle 3 can move on itself at a constant speed. When identical moving speed is provided for a plurality of vehicles 3, they can respectively keep on moving themselves at a constant pitch.

Even when a pair of strikers 12 and 12 are introduced in place of the gauge 10, and yet, even when the reference distance L is set up on the basis of the distance between adjoining strikers, like the case of using the gauge 10, the travel distance per unit-pulses calculation unit 62 can also correctly count the number of pulses in the range of the reference distance L.

Accordingly, the predetermined moving speed of each vehicle can be controlled with extreme precision by installing a number of the gauges 10 or plural pairs of strikers 12 and 12 at plural positions along the traveling path of those vehicles 3 or at such specific positions where the moving speed of the vehicles is variable.

Next, another embodiment of the invention is described below. Unlike the first embodiment in which the predetermined arrival position of the vehicle is sought by computing the traveling amount per pulse, the second embodiment executes the control of the moving speed of the vehicle 3 by initially computing the number of pulses per basic traveling amount on the basis of the number of pulses corresponding to the passage of the moving vehicle along the gauge 10, and then, on the basis of the computed number of pulses, the second embodiment computes the number of pulses S(t), thus achieving precise control of the moving speed of the vehicle as was done for the first embodiment.

The second embodiment does not execute division, but instead, it merely executes multiplication, thus simplifying the computing process.

Figure 9:
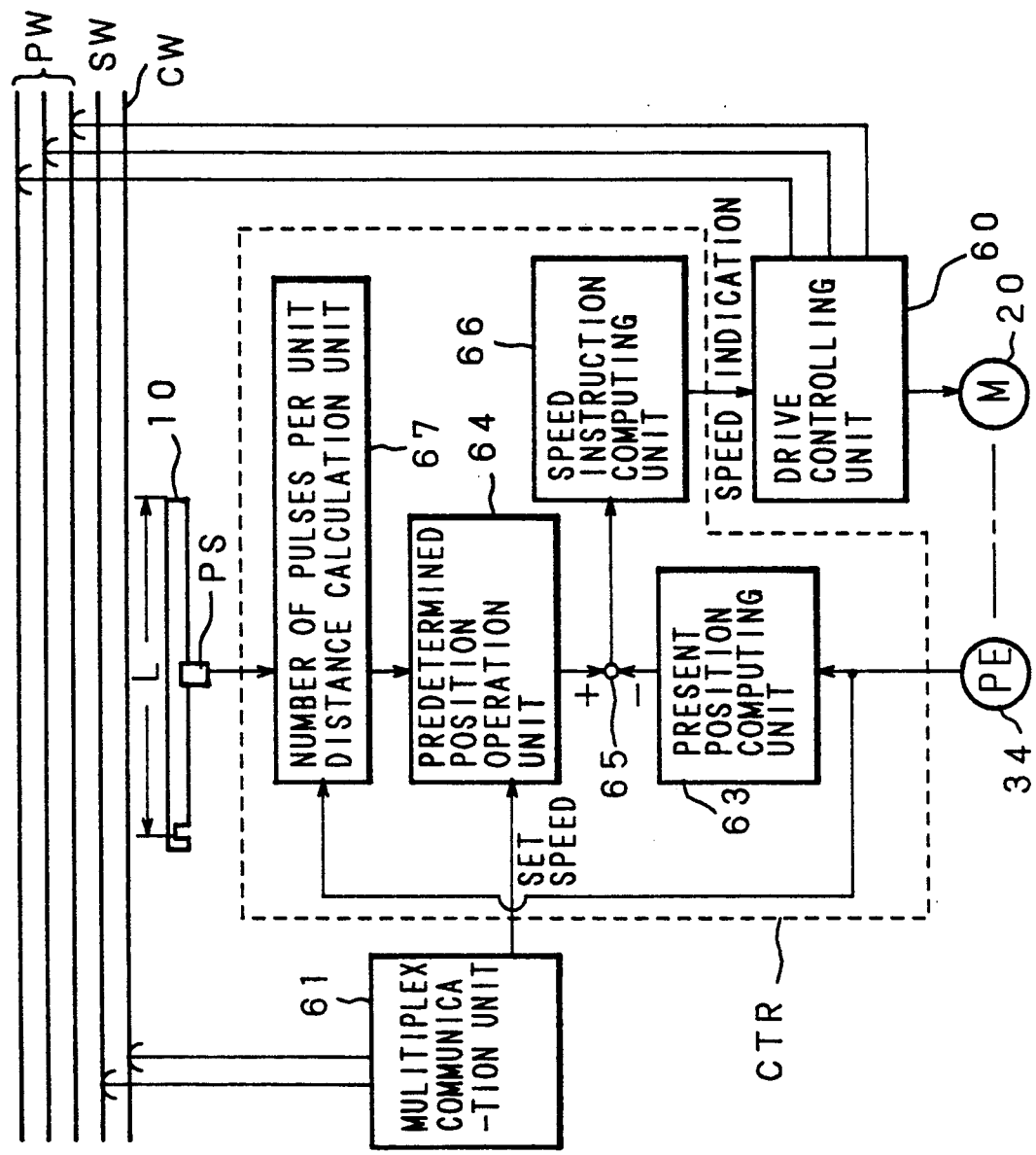
FIG. 9 designates a schematic block diagram of the speed controller unit and the peripheral structure thereof according to another embodiment of the invention.

FIG. 9 designates the schematic block diagram of the speed controller CTR according to the second embodiment of the invention. Unlike the first embodiment, the speed controller CTR according to the second embodiment is provided with a number of pulses per unit distance calculation unit 67 in place of the travel distance per unit-pulses calculation unit 62 introduced to the first embodiment. Since other structural components of the speed controller CTR provided for the second embodiment are exactly identical to those which are available for the first embodiment, description of these is omitted.

On the basis of the number (n) of pulses counted in connection with the reference distance L, the number of pulses per unit distance calculation unit 67 computes the number of pulses PN per unit distance by applying the equation shown below.

$$PN = \frac{n}{L} \qquad (5)$$

On the basis of the computed pulse number PN and setup speed m(c), the predetermined position operation unit 64 computes the predetermined arrival position of the vehicle by applying the equation shown below.

$$S(t) = S(t - \Delta t) + \Delta t \cdot PN \cdot v(t) \qquad (6)$$

Figure 10:
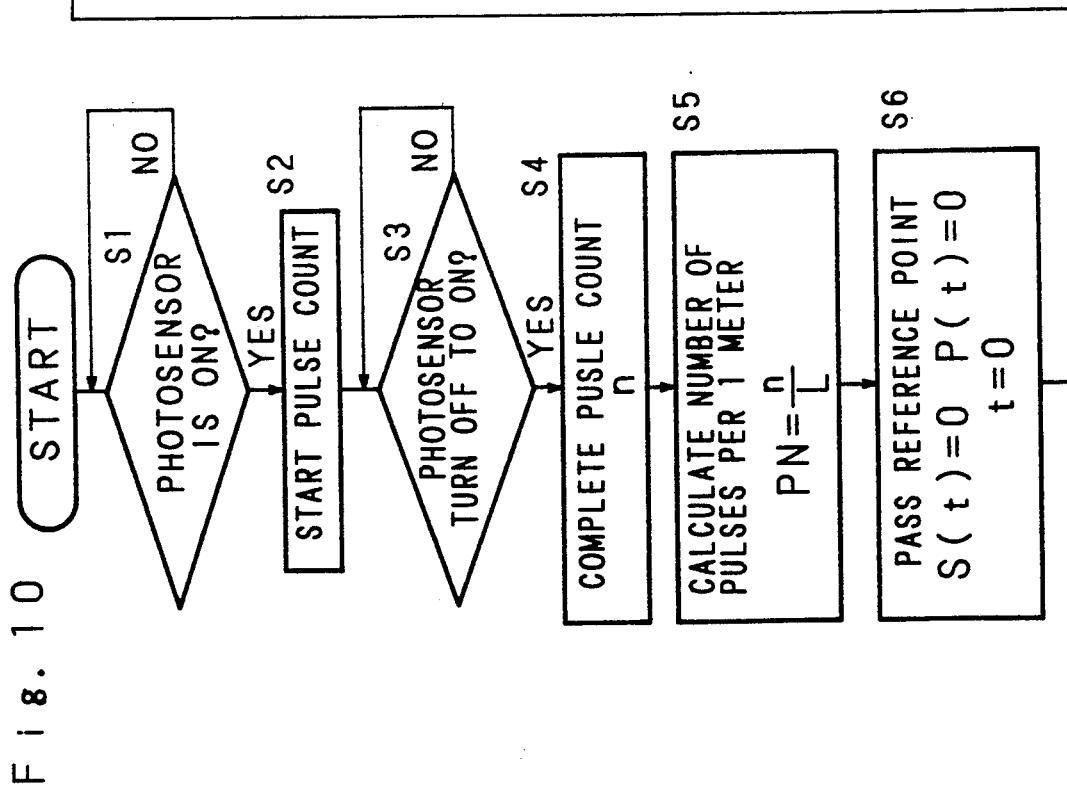
FIG. 10 designates an operational flowchart representing the content of the sequential speed control steps performed by the speed controller unit according to another embodiment of the invention.

FIG. 10 designates the flowchart of the content of the speed control operation performed by the speed controller CTR according to the second embodiment of the invention. Unlike the first embodiment, the speed controller CTR of the second embodiment executes computation of the above equation (5) while step S5 is underway, and then computes the number of pulses S(t) outputted from the pulse encoder 34 by applying the above equation (6) while step S7 is underway until the vehicle 3 arrives at the predetermined arrival position. Since all the functional steps except for steps S5 and S7 are identical to those of the first embodiment, description of these is deleted.

Figure 11:
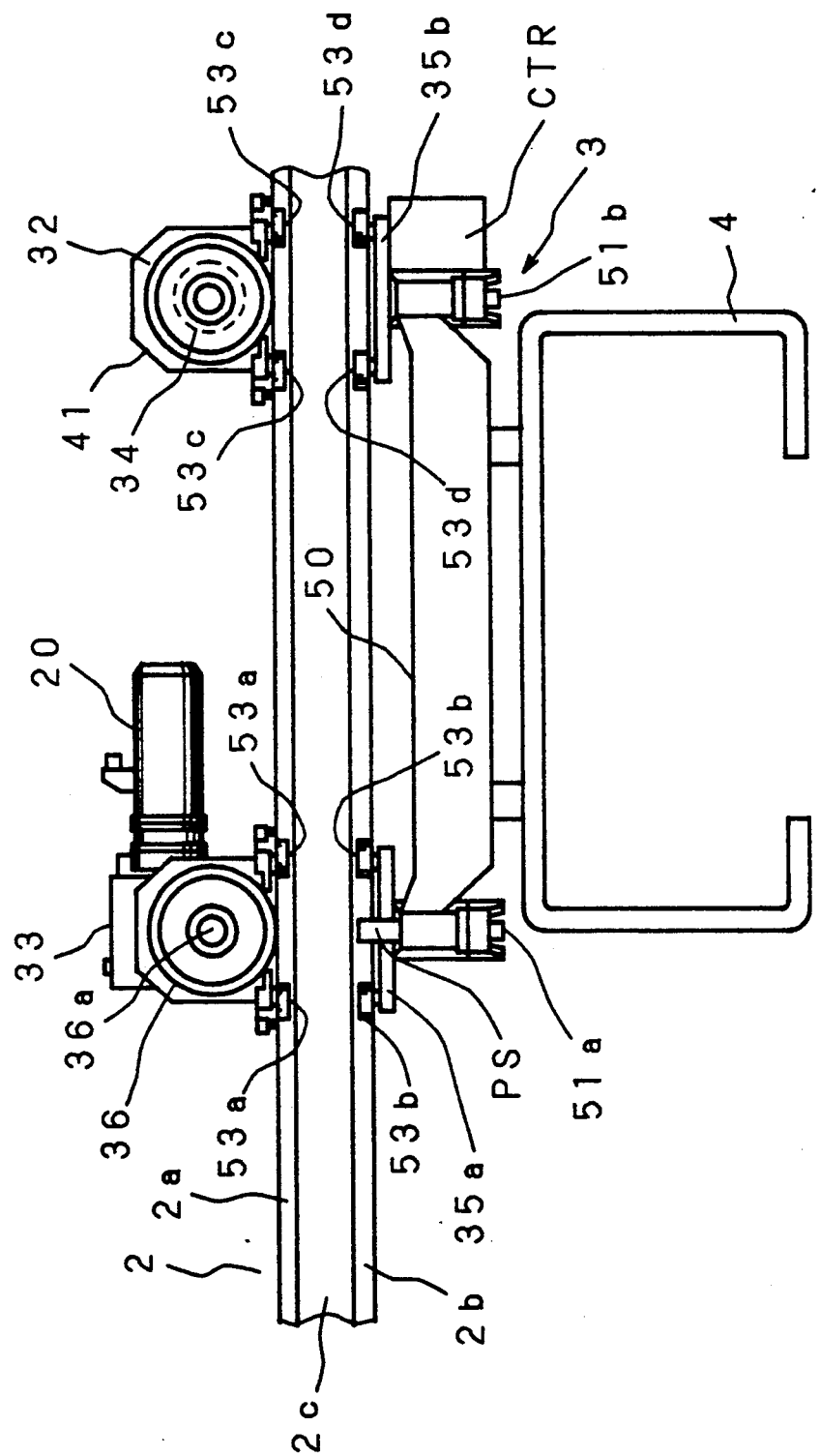
FIG. 11 designates a lateral view of a vehicle provided with a pulse encoder which is secured to a position different from that is shown in FIG. 3.

FIG. 11 designates a lateral view of the vehicle 3 according to the third embodiment of the invention. The pulse encoder 34 is installed on the part of the follower wheel 32. The pulse encoder 34 outputs pulses relative to the rotation of the follower wheel 32. All other structural components are exactly identical to those of the first embodiment.

Since the pulse encoder 34 is installed on the part of the follower wheel 32, unlike the driving wheel 36 which may be subject to accidental slip, the follower wheel 32 does not slip itself when the vehicle 3 is driven along the track, and as a result, the speed controller CTR can constantly detect the correct number of output pulses corresponding to the actual travel amount of the vehicle 3. This in turn further promotes precision in the control of the moving speed of the vehicle.

The speed control systems of the above embodiments respectively receive pulses corresponding to the travel amount of the vehicle 3 from the pulse encoder 34. It should be understood however that the pulse generating source is not merely limited to the pulse encoder 34 alone. In addition, the above description has solely referred to the application of the method of and the apparatus for controlling the speed of vehicles to the automobile assembly line. Nevertheless, it should also be understood that this is merely one of typical applicable potentials of the invention, and thus, the scope of the applicability of the invention is by no means confined to the automobile assembly line alone.

As is clear from the above description, according to the method of and the apparatus for controlling the vehicle speed embodied by the invention, the actual travel amount per pulse is computed on the basis of the number of pulses counted in a predetermined period in which the vehicle passes through the reference distance range, and thus, on the basis of the computed travel amount and the setup speed, the speed controller computes the number of pulses varied in a predetermined period of time. The speed control system thus properly controls the actually set traveling speed of the vehicle relevant to the difference between the computed number of pulses and the varied number of pulses after the predetermined period of time is past. As a result, independent of load applied to the vehicle, the speed control apparatus embodied by the invention can precisely keep the vehicle moving at a constant speed. When providing a plurality of vehicles with the predetermined moving speed identical to each other, the speed control apparatus embodied by the invention can keep all the vehicles moving by themselves at a constant pitch.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds thereof are therefore intended to be embraced by the claims.

What is claimed is:

1. A method of controlling vehicle speed, wherein a pulse generator outputting pulses in connection with the movement of a vehicle is provided on said vehicle, and a speed instruction is given to a vehicle driving unit so that said vehicle runs at a setup speed on the basis of the result of the counting of said output pulses, said method comprising the sequential steps of:
   detecting a predetermined travel distance;
   counting the number of pulses which are outputted while detecting said predetermined travel distance;
   calculating travel distance per a predetermined number of pulses on the basis of the counted number of pulses;
   computing the number of pulses to be outputted in a predetermined period of time on the basis of the calculated travel distance and the setup speed at the moment of computing said number of pulses;
   detecting the number of actually outputted pulses in said predetermined period of time; and
   giving the instruction of moving speed of said vehicle relevant to the difference between the computed number of pulses and the number of actually detected pulses.

2. The method of controlling vehicle speed as set forth in claim 1, wherein said step of detecting said predetermined travel distance is detected every time said vehicle passes by each of a plurality of gauges of a specific length which are respectively disposed at different positions along the traveling path of said vehicle.

3. The method of controlling vehicle as set forth in claim 1, wherein said step of detecting said travel predetermined distance is detected every time said vehicle passes by each pair of a plurality of pairs of strikers which are respectively disposed at different positions apart from each other at specific intervals along the traveling path of said vehicle.

4. The method of controlling vehicle speed as set forth in claim 1, wherein said vehicle is driven along the predetermined traveling path by means of a driving wheel driven by a motor and a follower wheel, and said pulse generator is attached to said motor.

5. The method of controlling vehicle speed as set forth in claim 1, wherein said vehicle is driven along the predetermined traveling path by means of a driving wheel which is driven by a motor and a follower wheel, and said pulse generator is attached to said follower wheel.

6. A method of controlling vehicle speed, wherein a pulse generator outputting pulses in connection with movement of a vehicle is provided on said vehicle, and a speed instruction is given to a vehicle driving unit so that said vehicle runs at a setup speed on the basis of the result of the counting of said output pulses, said method comprising the sequential steps of:
   detecting a predetermined travel distance;
   counting the number of pulses which are outputted while detecting said predetermined travel distance;
   calculating the number of pulses per unit distance on the basis of the counted number of pulses;
   computing the number of pulses outputted in a predetermined period of time on the basis of the calculated number of pulses and the setup speed at the moment of computing the number of pulse per unit distance;
   detecting the number of actually outputted pulses in said predetermined period of time; and
   giving the instruction of moving speed of said vehicle relevant to the difference between the computed number of pulses and the detected number of pulses.

7. The method of controlling vehicle speed as set forth in claim 6, wherein said step of detecting said predetermined travel distance is detected every time said vehicle passes by each of a plurality of gauges of a specific length disposed at different positions along the traveling path of said vehicle.

8. The method of controlling vehicle speed as set forth in claim 6, wherein said step of detecting said predetermined travel distance is detected every time said vehicle passes by each pair of a plurality of pairs of strikers disposed at different positions apart from each other at specific intervals along the traveling path of said vehicle.

9. The method of controlling vehicle speed as set forth in claim 6, wherein said vehicle is driven along the predetermined traveling path by means of a driving wheel driven by a motor and a follower wheel, and wherein said pulse generator is attached to said motor.

10. The method of controlling vehicle speed as set forth in claim 6, wherein said vehicle is driven along the predetermined traveling path by means of a driving wheel driven by a motor and a follower wheel, and said pulse generator is attached to said follower wheel.

11. A vehicle speed controlling apparatus which is provided with a pulse generator outputting pulses in connection with movement of a vehicle and gives an instruction so that said vehicle runs at the setup speed according to the result of the counting of the output pulses, said apparatus comprising:
   predetermined travel distance detecting means for detecting a predetermined travel distance;
   pulse counting means for counting the number of pulses outputted while said predetermined travel distance detecting means detects the predetermined travel distance;
   unit travel distance calculating means for calculating traveling distance per a predetermined number of pulses on the basis of the number of pulses counted by said pulse counting means;
   pulse number computing means for computing the number of pulses outputted in a predetermined period of time on the basis of the travel distance calculated by said unit travel distance calculating means and the speed set up at the moment of computing said number of pulses;

pulse number detecting means for detecting the number of pulses actually outputted in said predetermined period of time;

pulse number difference computing means for computing the difference between the number of pulses computed by said pulse number computing means and the number of pulses detected by said pulse number detecting means; and means for giving the instruction of the vehicle speed relevant to the difference of the number of pulses computed by said pulse number difference computing means.

12. The vehicle speed controlling apparatus as set forth in claim 11, wherein said predetermined travel distance detecting means detects the predetermine travel distance every time said vehicle passes by each of a plurality of gauges of a specific length disposed at different positions along the traveling path of said vehicle; said pulse counting means counts the number of pulses outputted while said predetermined travel distance detecting means detects the predetermined travel distance; and said unit travel distance calculating means calculates a travel distance per the predetermined number of the pulses on the basis of the counted number of pulses, and then renews the travel distance every time said vehicle passes by each gauge.

13. The vehicle speed controlling apparatus as set forth in claim 11, wherein said predetermined travel distance detecting means detects the predetermined travel distance every time said vehicle passes by each pair of a plurality of pairs of strikers which are disposed at different positions apart from each other at specific interval along the traveling path of said vehicle; said pulse counting means counts the number of pulses outputted while said predetermined travel distance counting means detects the predetermined pulse distance; and said unit travel distance calculating means calculates a travel distance per the predetermined number of pulses on the basis of the counted number of pulses, and then renews the travel distance every time said vehicle passes by each pair of strikers.

14. The vehicle speed controlling apparatus as set forth in claim 11, wherein said vehicle is driven along the predetermined traveling path by means of a driving wheel driven by a motor and a follower wheel, and said pulse generator is attached to said motor.

15. The vehicle speed controlling apparatus as set forth in claim 11, wherein said vehicle is driven along the predetermined traveling path by means of a driving wheel driven by a motor and a follower wheel, and said pulse generator is attached to said follower wheel.

16. A vehicle speed controlling apparatus which is provided with a pulse generator outputting pulses in connection with movement of a vehicle and gives an instruction so that said vehicle runs at the setup speed according to the result of the counting of the outputted pulses, said apparatus comprising:

predetermined travel distance detecting means for detecting a predetermined travel distance;

pulse counting means for counting the number of pulses outputted while said predetermined travel distance detecting means detects the predetermined travel distance;

unit pulses calculating means for calculating the number of pulses per unit distance on the basis of the number of pulses counted by said pulse counting means;

pulse number computing means for computing the number of pulses outputted in a predetermined period of time on the basis of the number of pulses computed by said unit pulses calculating means and the setup speed at the moment of computing the number of pulses;

pulse number detecting means for detecting the number of pulses actually outputted in said predetermined period of time;

pulse number difference computing means for computing the difference between the number of pulses computed by said pulse number computing means and the number of pulses detected by said pulse number detecting means; and means for giving the instruction of the moving speed of said vehicle relevant to the difference of the number of pulses computed by said pulse number difference computing means.

17. The vehicle speed controlling apparatus as set forth in claim 16, wherein said predetermined travel distance detecting means detects the predetermined travel distance every time said vehicle passes by each pair of a plurality of gauges of a specific length disposed at different positions along the traveling path of said vehicle, said pulse counting means counts the number of pulses outputted while said predetermined travel distance detecting means detects the predetermined travel distance, and said unit pulses calculating means calculates the number of pulses per unit distance on the basis of the counted number of pulses and then renews the number of pulses every time said vehicle passes by each gauge.

18. The vehicle speed controlling apparatus as set forth in claim 16, wherein said predetermined travel distance detecting means detects the predetermined travel distance every time said vehicle passes by each pair of a plurality of pairs of strikers disposed at different positions apart from each other at specific intervals along the traveling path of said vehicle, said pulse counting means counts the number of pulses outputted while said predetermined travel distance detecting means detects the predetermined distance; and said unit pulses calculating means calculates the number of pulses per unit distance on the basis of the counted number of pulses and then renews the number of pulses every time said vehicle passes by each pair of said strikers.

19. The vehicle speed controlling apparatus as set forth in claim 16, wherein said vehicle is driven along the predetermined traveling path by means of a driving wheel driven by a motor and a follower wheel, and said pulse generator is attached to said motor.

20. The vehicle speed controlling apparatus as set forth in claim 16, wherein said vehicle is driven along the predetermined traveling path by means of a driving wheel driven by a motor and a follower wheel, and said pulse generator is attached to said follower wheel.

* * * * *